(12) United States Patent
Fernandes

(10) Patent No.: US 7,011,779 B2
(45) Date of Patent: Mar. 14, 2006

(54) POLY-STEEL DOUBLE WALL TANK

(75) Inventor: Elson G. Fernandes, Kitchener (CA)

(73) Assignee: Clemmer Technologies Inc., Waterloo (CA)

( * ) Notice: Subject to any disclaimer, the term of this patent is extended or adjusted under 35 U.S.C. 154(b) by 802 days.

(21) Appl. No.: 10/470,634

(22) Filed: Feb. 28, 2002

(65) Prior Publication Data

US 2005/0173441 A1    Aug. 11, 2005

Related U.S. Application Data

(63) Continuation of application No. 09/210,833, filed on Dec. 15, 1998, now Pat. No. 6,371,323.

(51) Int. Cl.
*B29C 41/04* (2006.01)

(52) U.S. Cl. .................. 264/138; 264/154; 264/161; 264/219; 264/310; 264/311; 156/242; 156/253; 156/290

(58) Field of Classification Search ............. 264/138, 264/154, 161, 310, 311; 156/242, 253, 290
See application file for complete search history.

(56) References Cited

U.S. PATENT DOCUMENTS

| | | | | |
|---|---|---|---|---|
| 3,882,591 A | * | 5/1975 | Yamamoto | 29/455 |
| 4,625,892 A | * | 12/1986 | Carlin, Jr. | 220/465 |
| 4,768,678 A | * | 9/1988 | Nusbaumer et al. | 220/444 |
| 5,364,012 A | * | 11/1994 | Davis et al. | 228/184 |
| 2002/0088805 A1 | * | 7/2002 | Roy | 220/560.03 |

* cited by examiner

*Primary Examiner*—Stefan Staicovici
(74) *Attorney, Agent, or Firm*—Daryl W. Schnurr

(57) ABSTRACT

An improved double wall tank has two or more threaded fittings, with a steel outer tank and a thermoplastic inner tank. The inner tank is formed within the outer tank by rotational molding. The inner tank is bonded to the outer tank in an area of the fittings, but is otherwise separate and apart from the outer tank. Before carrying out the rotational molding process, bonding material is applied to the outer tank in the area of the fittings. The thermoplastic material is in powder form and includes mold release material. The thermoplastic material is inserted into the outer tank before rotational molding. The degree of shrinkage of the inner tank can be controlled by air pressure including an area between the fittings.

6 Claims, 5 Drawing Sheets

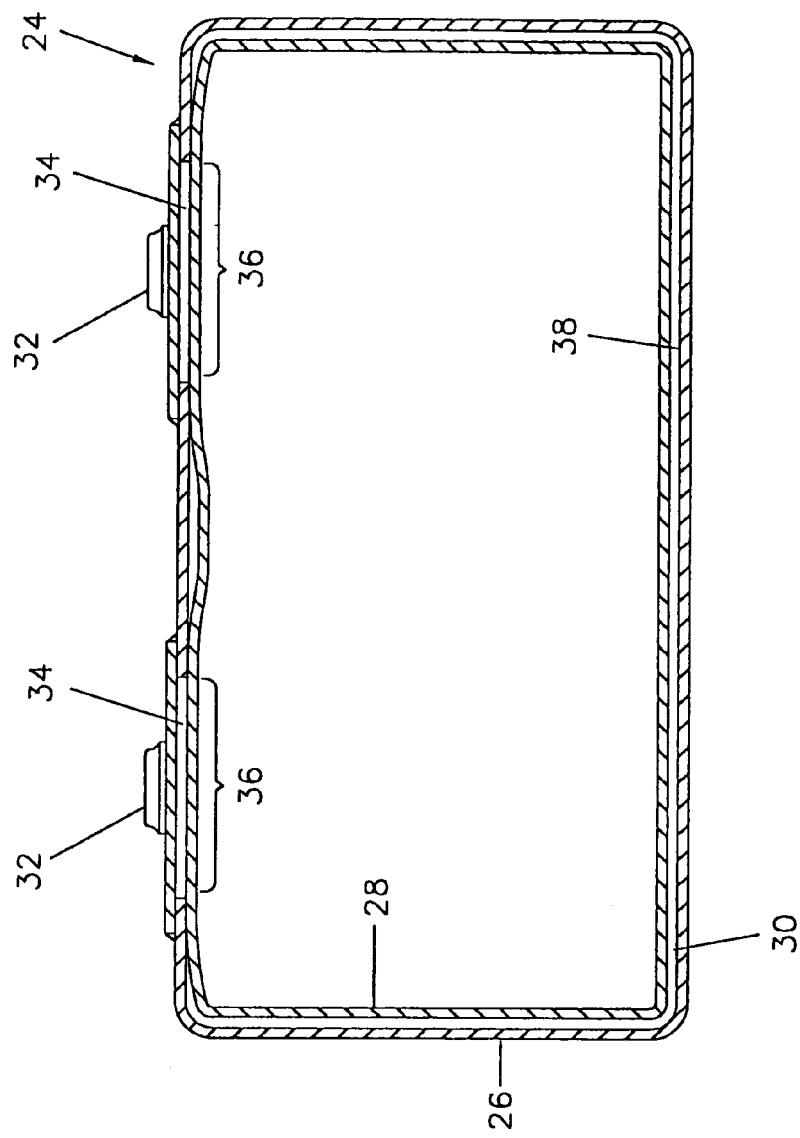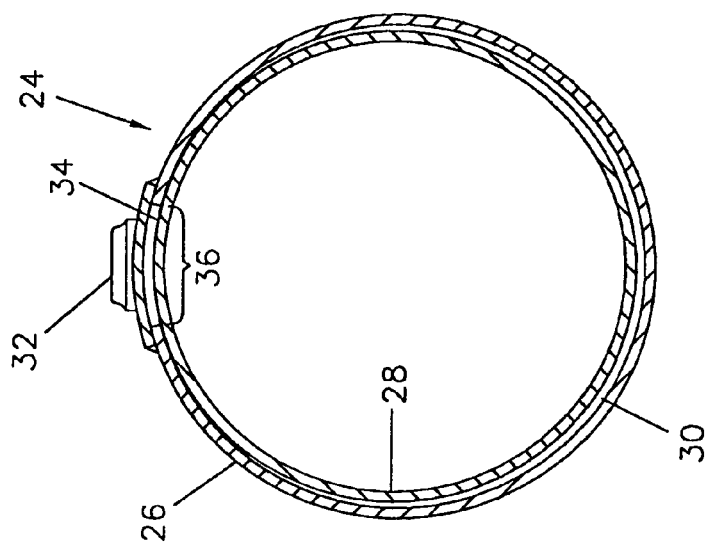

POLY-STEEL DOUBLE WALL TANK

This application is a continuation of U.S. application Ser. No. 09/210,833, filed Dec. 15, 1998, now U.S. Pat. No. 6,371,323 B1.

BACKGROUND OF THE INVENTION

1. Field of Invention

This invention relates to an improved double wall tank having an outer tank of steel and an inner tank of thermoplastic material. More particularly, this invention has an outer tank with at least two fittings thereon and the inner tank is separate and apart from the outer tank except that it is bonded to outer tank in the area of the fittings.

2. Description of the Prior Art

It is known to have outer steel tanks with inner tanks made from thermoplastic material. The inner tank is formed by rotation molding within the outer tank and separates from the outer tank when the tank cools (see U.S. Pat. No. 4,625,892). When the inner tank cools, the thermoplastic material shrinks. In tanks that have two or more fittings, as the inner tank shrinks, that portion of the inner tank wall located between the two fittings is placed under enormous stress. The stress can cause the inner tank to rupture or to fail prematurely at the corners where the inner tank bends into the flanges for the fittings.

It is also known to line a tank with an inner layer of polymeric material where the polymeric material is bonded to an inner surface of the tank (see U.S. Pat. No. 5,358,682). An advantage of a double wall tank where there is a space between the inner tank and the outer tank is that a leak detection system can monitor the space between the two walls.

SUMMARY OF THE INVENTION

It is an object of the present invention to provide an outer tank of steel having an inner tank of thermoplastic material where the outer tank has at least two fittings and the bonding of the inner tank to the outer tank can be controlled so that the inner tank is bonded to the outer tank in the area of the fittings that is otherwise separate and apart from the outer tank.

A double wall tank has an outer tank of steel and an inner tank of thermoplastic material. The outer tank has an inner surface having first areas and a second area. One of the first areas is located adjacent to each of at least two fittings that are separate from one another. The second area is a remainder of the inner surface that is not the first areas. The thermoplastic material is bonded to the outer tank in the first areas and separate from the outer tank in the second area.

A method of constructing a double wall tank having an outer tank of steel and an inner tank of thermoplastic material, said outer tank having an inner surface with first areas and a second area, one of said first areas being located adjacent to each of at least two fittings that are separate and apart from one another, said outer tank having an opening at each fitting, said second area being a remainder of said inner surface that is not said first areas, said method comprising applying bonding material to said first areas, inserting said thermoplastic material in powder form into said outer tank through an opening for a fitting, said powder including mold release material, inserting a plug into each opening, subjecting the outer tank to heat and rotating the outer tank to mold said inner tank within said outer tank, cooling said tanks, resulting in an inner wall of said thermoplastic material that is bonded to said first areas and separated from said second area, removing each plug and cutting an opening through said thermoplastic material at each opening.

BRIEF DESCRIPTION OF THE DRAWINGS

FIG. 2 is a sectional side view of a tank having two fittings;

FIG. 3 is a sectional end view of the tank of FIG. 2;

DESCRIPTION OF A PREFERRED EMBODIMENT

Figure 1:
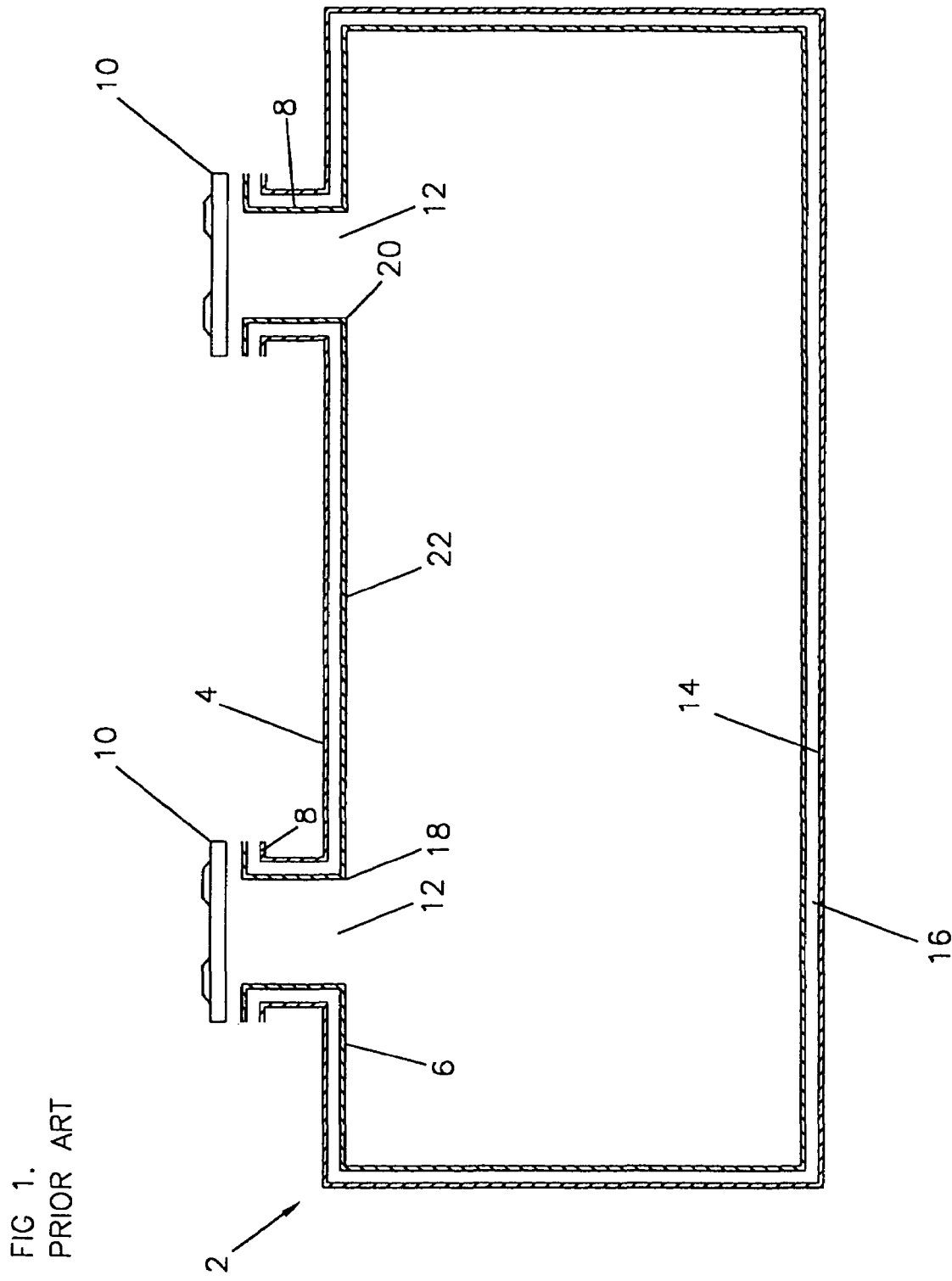
FIG. 1 is a sectional side view of prior art tank with two fittings and the inner tank extending within the flanges.

In FIG. 1, there is shown a prior art double wall tank 2 where an outer steel tank 4 has an inner thermoplastic tank 6. The tank 2 has two flanges 8 and two flange covers 10. One flange cover 10 covers each tank opening 12. The tank 2 is manufactured by rotational molding to mold the inner tank within the outer tank. The outer tank is heated during the molding process causing the inner tank to form on an inner surface 14 of the outer tank 4. There is a space 16 between the two tanks 4,6 where leak detection equipment (not shown) can monitor for leaks. When the two tanks are cooled either as part of or after the molding process, the inner tank 6 shrinks relative to the outer tank 4, thereby creating the space between the two tanks. The space and shrinkage may be controlled by the addition of air pressure into the inner tank during the cooling process. The shrinkage causes stress on the inner tank junctures 18,20, often resulting in stress cracking of the inner tank in an area 22 between the junctures 18,20. When threaded fittings are required with the prior art tank, they are supplied by attachment to each of the flange covers 10. Air pressure cannot alleviate the stress at junctures 18, 20. Air pressure cannot be used to exert longitudinal pressure on the inner tank in the area between the flanges because the inner tank contains an opening at each flange.

In FIG. 2 there is shown a double wall tank 24 having an outer tank 26 and an inner tank 28 with an interstice 30 located between the two tanks 26, 28. The interstice can be used (usually by creating a vacuum) to monitor the inner tank for leaks. The tank 24 has two fittings 32. It can be seen that the inner tank 28 is affixed to a cover 34 in two first areas 36 adjacent to the fittings 32. The second area is a remainder of an inner surface 38 of the outer tank 26.

In FIG. 3, there is shown a sectional end view of the tank 24. The same reference numerals are used in FIG. 3 as those used in FIG. 2 for those components that are identical.

Figure 4:
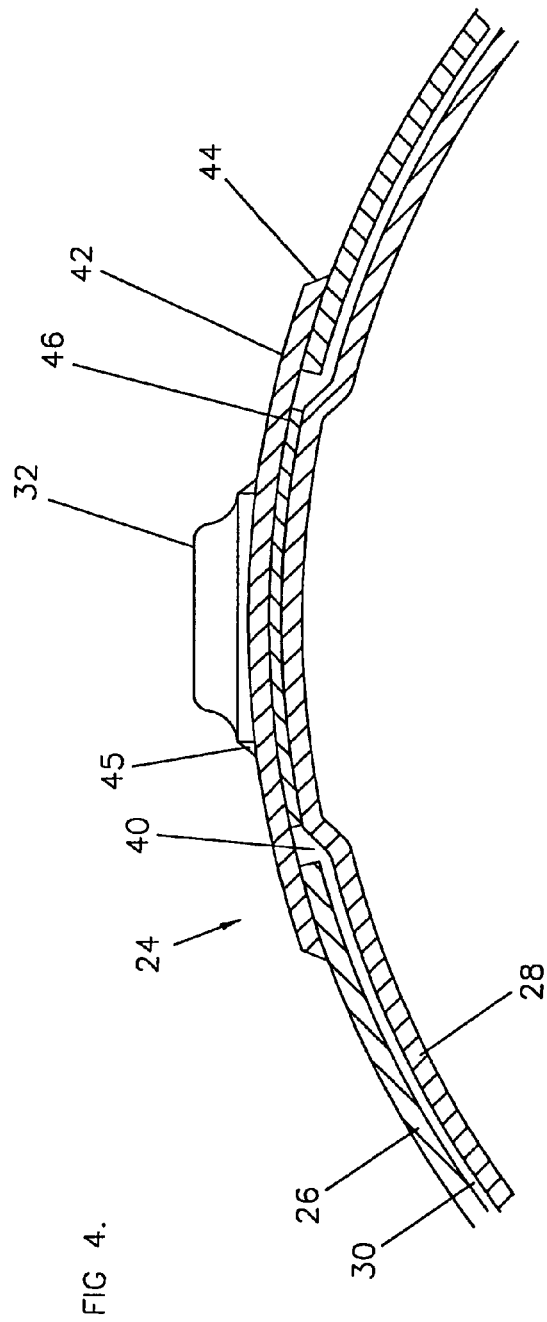
FIG. 4 is a partial perspective sectional view of the tank of FIG. 2 at one of the fittings with a cover located between the fitting and a tank wall.

In FIG. 4, there is shown a partial sectional view of the tank 24 in the area of one of the fittings 32. The same reference numerals are used in FIG. 4 as those used in FIG. 2 to describe those components that are identical to one another. Tank 24 has an opening 40 that is substantially closed off by cover 42, which is welded to the tank by welds 44. Similarly, the fittings 32 are welded to the cover 42 by welds 45. The cover 42 has a hole (not shown) therein to allow access through a corresponding opening (not shown) in the fitting 32. A bonding agent 46 is applied to an inner surface of the cover 42. The thickness of the bonding agent 46 is exaggerated for purposes of illustration.

It can be seen that the inner tank 28 is bonded to the cover 42 in the area where the bonding agent 46 has been applied (one of the first areas) and separated from the outer tank 26 by an interstice 30 in the remaining circumference of the tank 24.

Figure 5:
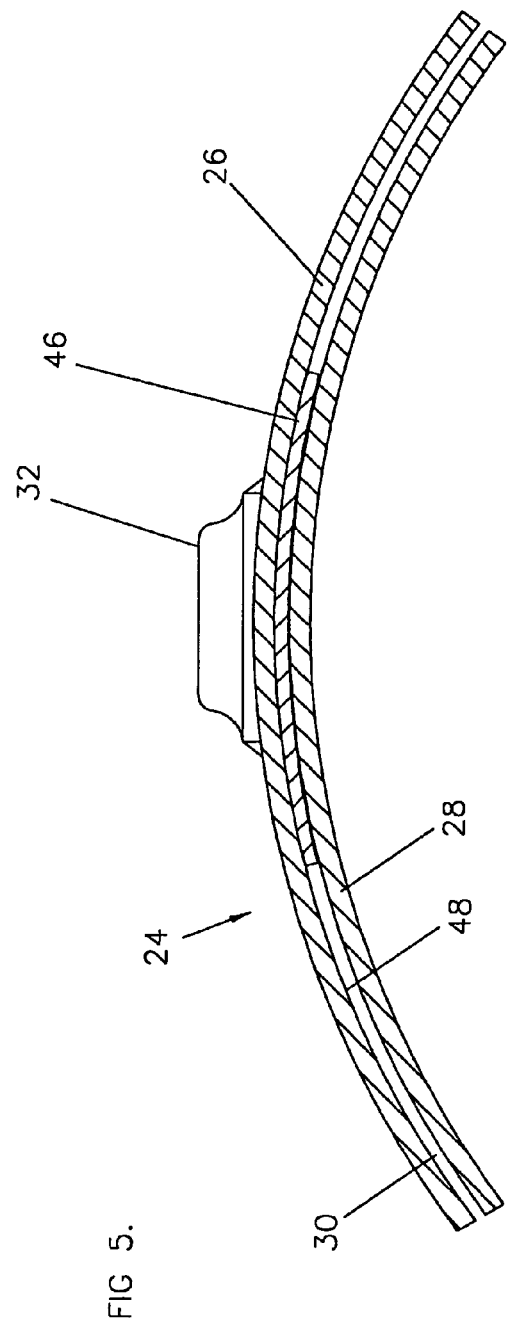
FIG. 5 is a partial sectional side view of a tank with a fitting affixed directly to a tank.

In FIG. 5, the cover 42 has been omitted and the fitting 32 is welded directly to the outer tank 26. The bonding agent 46 is coated onto an inner surface 48 of the tank 24 and the inner tank 28 is bonded to the inner wall 48 of the outer tank 26 in the area of the fitting 32, but separated from the inner wall 48 through the remaining area of the tank 24. In FIG. 5, the fitting 32 covers an opening (not shown) in the tank wall 48.

Figure 6:
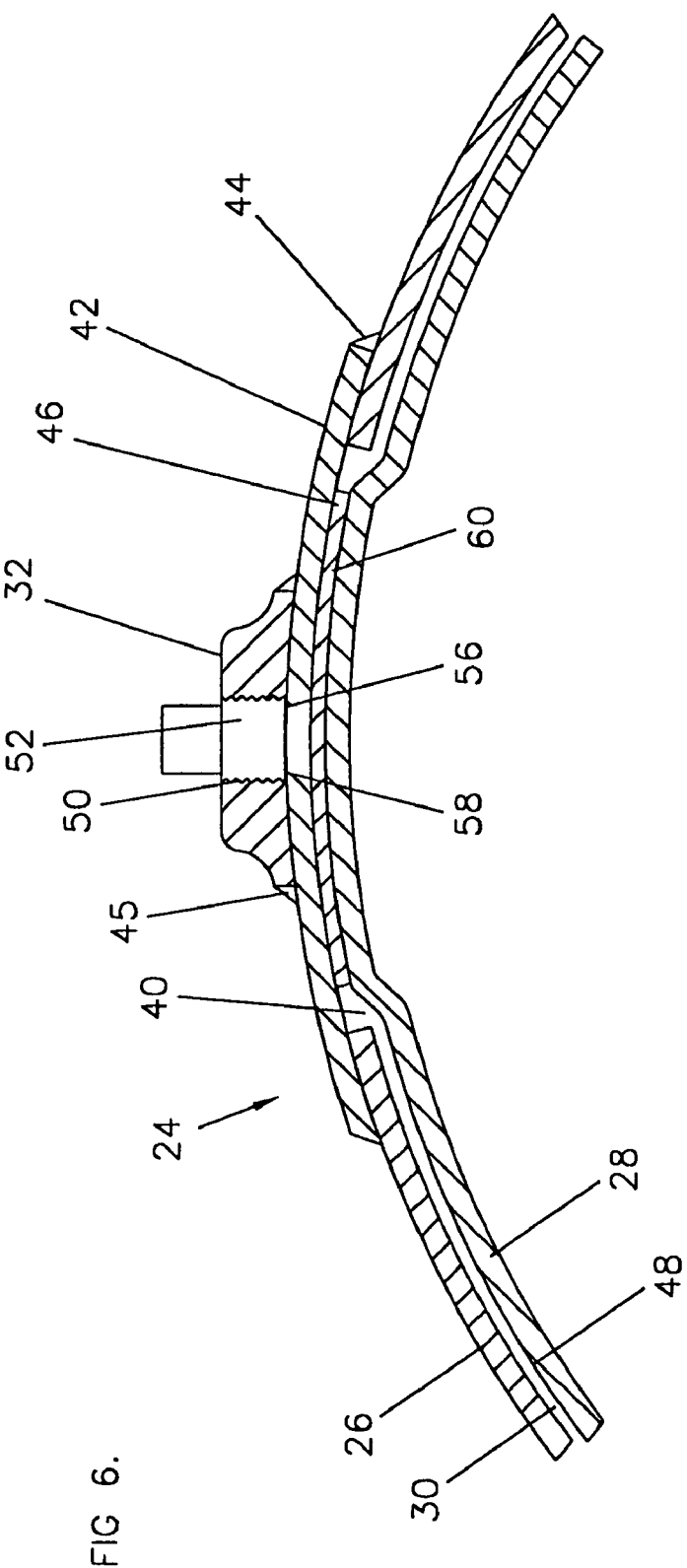
FIG. 6 is a partial sectional view of a tank where the section is taken through the fitting.

In FIG. 6, there is shown a sectional view of the tank 24 through the fitting 32. It can be seen that the fitting 32 has screw threads 50 in an opening 52 that contains a plug 54. Unthreaded flanged fittings may also be used in place of the threaded fittings. An interior surface 56 of the plug 54 is coated with bond release material 58. The thickness of the bond release material is exaggerated for ease of illustration. Those components of FIG. 6 that are identical to the components of FIG. 4 are described using the same reference numeral. The opening 52 extends through the cover 42.

During manufacture, the opening 52 of at least one of the fittings 32 is open and thermoplastic material in powder form is inserted into the outer tank 26 through the opening 52. At the same time, bonding agent 46 is coated onto an interior surface of the cover 42 (or, if there is no cover, the bonding agent is coated onto an inner surface 60 of the tank around the fitting 32). A breather pipe is installed into one opening in the tank to vent off gases formed during the rotational molding process. All other openings are then closed off by plugs 54 preferably containing mold release material 58 on the inner end 56 thereof. Preferably, the plugs are made from teflon or are teflon coated.

The outer tank 26 is then rotationally molded and heated during the rotational molding process to melt the thermoplastic powder and coat the inner surface 48 of the outer tank 26 with thermoplastic material.

As a result of the molding process, after the inner tank 26 and outer tank 28 are cooled the inner tank 28 falls away from the outer tank 26 in all areas except for those areas that were coated with bonding agent. The bonding agent is not affixed to the tank on the interior surface of the plug because of the presence of the bond release material 58. The plug is then removed from the opening 52 and a hole is cut through the thermoplastic material located directly beneath the opening 52. The tank 24 is then ready for use, permitting the attachment of threaded piping directly to the threaded fittings of the tank.

Figure 7:
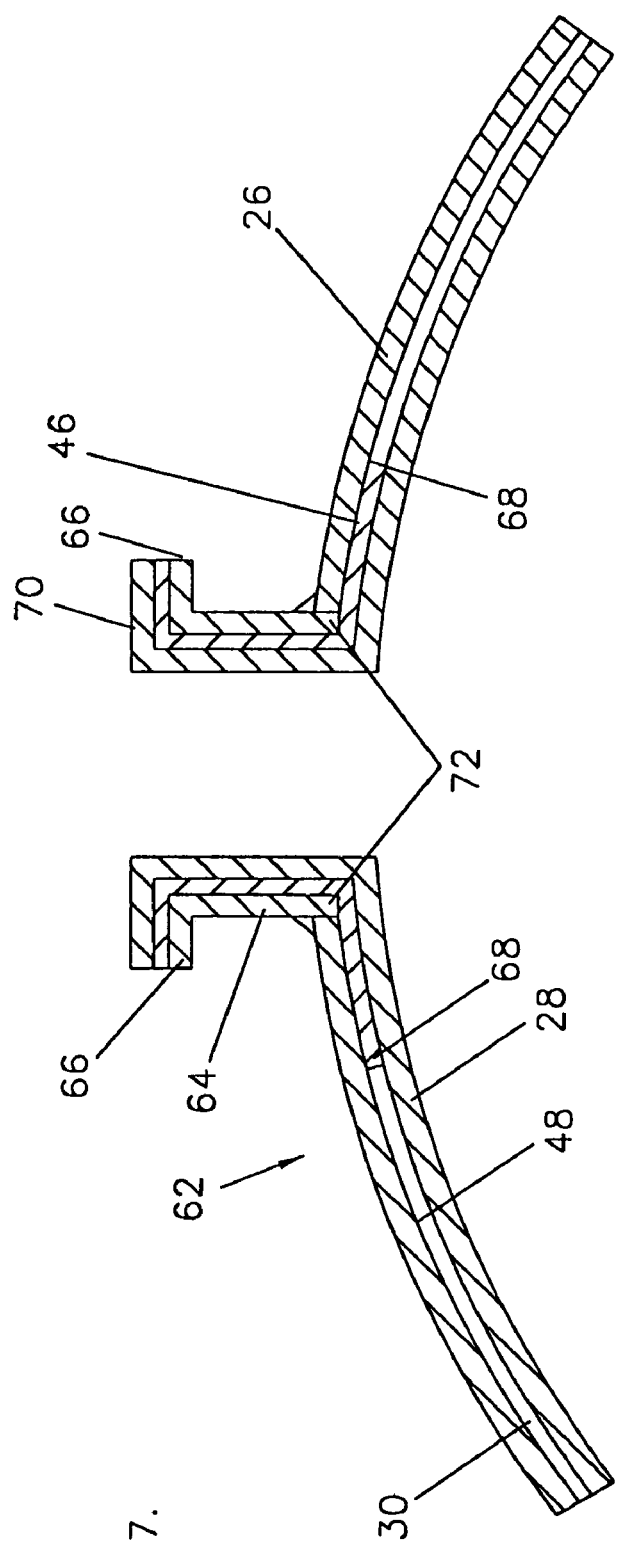
FIG. 7 is a partial sectional sideview of a tank having a flange fitting.

Meanwhile many thermoplastic materials are suitable for the inner tank, the most commonly used materials are polypropylene, nylon (a trade mark) and polyethylene. Usually, the tank openings will be located along a top of the tank, but openings can be located at any convenient location in the outer tank wall. In FIG. 7, there is shown a portal sectional view of an outer tank 62 having a flanged fitting 64. Those components of FIG. 7 that are identical to the components of FIG. 6 are described using the same reference numeral. The flange fitting 64 is preferably coated with bonding agent 46 within the fitting 64 from an outer point 66 to an inner point 68 around the flanged fitting 64. This causes the inner part of the flanged fitting 64 to be coated with thermoplastic material 70 that is part of the inner tank 28. It should be noted that the bonding agent 46 coats an inner corner 72 of the flanged fitting 64 to eliminate the corner 72 as a high stress point when the inner tank cools and separates from the outer tank 62. While shrinkage of the inner tank during cooling can be controlled by controlling internal gas pressure within the tank 28, shrinkage cannot be easily controlled in the area between two flanged fittings. However, by bonding the inner tank to the outer tank within the flanged fittings and beyond the corner 72 the risk of the inner tank failing prematurely because of stress caused by shrinkage is greatly reduced.

I claim:

1. A method of constructing a double wall tank having an outer tank of steel and an inner tank of thermoplastic material, said outer tank having an inner surface with first areas and a second area, said first areas being located adjacent to each of at least two fittings that are separate and apart from one another, said second area being a remainder of said inner surface that is not said first areas, said method comprising applying bonding material to said first areas and not to second area, inserting thermoplastic material in powder form into said outer tank through an opening for a fitting, inserting a plug in each opening, said powder including mold release material, subjecting the outer tank to heat and rotating said outer tank to mold said inner tank within said outer tank, cooling said tanks to form said double wall tank having an inner wall of said thermoplastic material that is bonded by said bonding material to said first areas and not bonded to said second area, removing each plug and cutting an opening through said inner wall of thermoplastic material at each opening.

2. A method as claimed in claim 1 including the step of controlling shrinkage of said inner tank during cooling by controlling pressure of gas within said tank.

3. A method as claimed in claim 1 including the steps of covering openings for said fittings with covers, applying bonding material to an interior surface of said covers, cutting openings into said covers after said rotational molding process has been completed and installing fittings.

4. A method as claimed in claim 2 including the steps of covering openings for said fittings with covers, applying bonding material to an interior surface of said covers, cutting openings into said covers after said rotational molding process has been completed and installing fittings.

5. A method as claimed in claim 1 including the step of installing threaded fittings.

6. A method as claimed in claim 2 including the step of installing threaded fittings.

* * * * *